US008441985B2

(12) United States Patent
Kim et al.

(10) Patent No.: US 8,441,985 B2
(45) Date of Patent: *May 14, 2013

(54) METHOD FOR DETERMINING ISR ACTIVATION IN MOBILE COMMUNICATIONS SYSTEM

(75) Inventors: Laeyoung Kim, Gyeonggi-Do (KR); Taehyeon Kim, Gyeonggi-Do (KR); Hyunsook Kim, Gyeonggi-Do (KR)

(73) Assignee: LG Electronics Inc., Seoul (KR)

( * ) Notice: Subject to any disclaimer, the term of this patent is extended or adjusted under 35 U.S.C. 154(b) by 135 days.

This patent is subject to a terminal disclaimer.

(21) Appl. No.: 12/908,418

(22) Filed: Oct. 20, 2010

(65) Prior Publication Data

US 2011/0090848 A1    Apr. 21, 2011

Related U.S. Application Data

(60) Provisional application No. 61/253,842, filed on Oct. 21, 2009, provisional application No. 61/289,364, filed on Dec. 22, 2009.

(30) Foreign Application Priority Data

Apr. 13, 2010   (KR) .................. 10-2010-0033987

(51) Int. Cl.
    *H04J 4/00*   (2006.01)

(52) U.S. Cl.
    USPC .......................................... 370/328; 370/338

(58) Field of Classification Search ................... 370/328
    See application file for complete search history.

(56) References Cited

U.S. PATENT DOCUMENTS

| 2009/0213762 | A1* | 8/2009 | Guo et al. ............. 370/254 |
| 2010/0061331 | A1* | 3/2010 | Guo et al. ............. 370/329 |
| 2010/0064038 | A1* | 3/2010 | Hu ........................ 709/223 |
| 2010/0120427 | A1  | 5/2010 | Guo |
| 2010/0220689 | A1* | 9/2010 | Hu et al. ............... 370/331 |
| 2010/0266107 | A1* | 10/2010 | Brusilovsky et al. ..... 379/46 |
| 2011/0021216 | A1* | 1/2011 | Pudney et al. .......... 455/466 |
| 2012/0142349 | A1* | 6/2012 | Guo et al. ............. 455/435.1 |

FOREIGN PATENT DOCUMENTS

| EP | 2 046 085    | 4/2009 |
| WO | 2009/052726  | 4/2009 |
| WO | 2009/097734  | 8/2009 |

OTHER PUBLICATIONS

Ericsson, ST-Ericsson, Information in the SCC AS for T-ADS(3GPP TSG SA WG2 Meeting #75), Aug. 31-Sep. 4 2009, Ericsson, ST-Ericsson, 3GGPP TSG WG2 Meeting# 75 (TD S2-095423) SAES IMSSCC-SPI/Rel-9.*
International Search Report from corresponding PCT/KR2010/007200.

* cited by examiner

*Primary Examiner* — Brandon Renner
*Assistant Examiner* — Gerald Smarth
(74) *Attorney, Agent, or Firm* — Morgan, Lewis & Bockius LLP

(57) ABSTRACT

Disclosed is a method for determining Idle mode Signaling Reduction (ISR) activation in a mobile communications system.
When a mobility management node decides to activate an ISR feature in an IMS network environment where hetero mobile communications networks (e.g., E-UTRAN and UTRAN/GERAN) interwork with each other, considered are not only whether an ISR feature can be supported, and whether a UE can use IMS voice, but also conditions (information) on whether IMS voice over PS domain can be supported. This may allow a voice call transferred to the UE from the network to be delivered to a domain (PS or CS domain) selected with consideration of an access network state without delay.

12 Claims, 5 Drawing Sheets

10

METHOD FOR DETERMINING ISR ACTIVATION IN MOBILE COMMUNICATIONS SYSTEM

CROSS-REFERENCE

The present application claims priority benefit to the following applications, which contents are all incorporated by reference herein: U.S. Provisional Application Nos. 61/253,842 (filed Oct. 21, 2009), 61/289,364 (Dec. 22, 2009), and Korean Patent Application No. 10-2010-0033987 (filed Apr. 13, 2010).

TECHNICAL FIELD

The present invention relates to a mobile communications system, and particularly, to a method for determining Idle mode Signaling Reduction (ISR) activation in a mobile communications system.

BACKGROUND ART

Generally, the $3^{rd}$ Generation Partnership Project (3GPP) for regulating technical standardizations of the third generation mobile communications system has been researched for LTE/SAE (Long Term Evolution/System Architecture Evolution) since the end of 2004 for an enhanced and optimized performance, in correspondence to several forums and new technologies relating to the $4^{th}$ generation mobile communications system. The SAE based on 3GPP SA WG2 relates to a network technology for determining an architecture of a network and supporting mobility between hetero networks together with LTE of 3GPP TSG RAN. The SAE, one of important standardization issues is in order to develop the 3GPP system into a system for supporting various IP-based radio access technologies. For an optimized packet-based system with minimized transfer delay by an enhanced data transfer capability, research has been executed.

FIG. 1 is a configuration view of an Idle mode Signaling Reduction (ISR) service. Referring to FIG. 1, a routing area, a tracking area, and an ISR area are divided from one another.

Hereinafter, the technical terms used in the present invention will be explained with reference to FIG. 1.

TA (tracking area) indicates an area to which E-UTRAN provides a service, and includes one or more E-UTRAN cells.

RA (routing area) indicates an area to which GERAN/UTRAN provides a service, and includes one or more GERAN/UTRAN cell.

TAI (Tracking Area Identity) list indicates a list of TAIs that identify the tracking areas (e.g., TA1, TA2, TA3, TA4 and TA5 in FIG. 1) that a UE can enter without performing a tracking area updating procedure. The TAI list has been defined in 3GPP TS 24.301 v9.1.0, and thus detailed explanations thereof will be omitted.

MME (Mobility Management Entity) area indicates a part of a network served by an MME. The MME area consists of one or several Tracking Areas. All cells served by one eNodeB are included in one MME Area. The MME area has been defined in 3GPP TS 23.002 v9.2.0, and thus detailed explanations thereof will be omitted.

Cell "camping on" indicates a state that the UE having completed a cell selection/reselection process selects a cell. The cell camping has been defined in 3GPP TS 36.304 v9.1.0, and thus detailed explanations thereof will be omitted.

ISR (Idle mode Signaling Reduction) indicates a service to enhance efficiency of network resources by reducing signaling for location registration when the UE moves between different access networks such as E-UTRAN and UTRAN/GERAN. Referring to FIG. 1, the ISR will be explained in more detail. When the UE camps on the E-UTRAN cell, the UE performs location registration on the MME. On the other hand, when the UE moves to camp on the UTRAN/GERAN cell, the UE performs location registration on the SGSN. However, when the UE frequently moves between the E-UTRAN and the UTRAN/GERAN, network resources may be wasted due to frequent location registration procedures. In order to reduce the waste, the present proposes an ISR method. According to the ISR method, in an idle mode, the UE respectively performs location registration on the MME and/or the SGSN (two mobility management nodes) via the E-UTRAN and/or the UTRAN/GERAN. However, the UE does not perform an additional location registration when moving between two pre-registered Radio Access Technologies (RAT), or when reselecting a cell. If downlink (DL) data is sent to a corresponding UE in an ISR activated state, paging is simultaneously transferred to the E-UTRAN and the UTRAN/GERAN. This may allow the network to successfully search for the UE and to deliver the DL data to the UE. The ISR has been defined in 3GPP TS 23.401 v9.3.0 and 3GPP TS 23.060 v9.3.0, and thus detailed explanations thereof will be omitted.

ICS (IMS Centralized Services) stably provides a consistent service to an IMS regardless of an access network to which the UE has attached (i.e., even if the UE has attached not only to IP-CAN but also to a CS domain). The ICS has been defined in 3GPP TS 23.292 v9.4.0, and thus detailed explanations thereof will be omitted.

IMS (IP Multimedia Subsystem) indicates a system for providing a multimedia service based on an IP.

AS (Application Server) indicates a server for providing various multimedia services.

SCC AS (Service Centralization and Continuity Application Server) indicates an application server for supporting continuity of a multimedia session. The SCC AS has been defined in 3GPP TS 23.292 v9.4.0 and 3GPP TS 23.237 v9.3.0, and thus detailed explanations thereof will be omitted.

CSFB (Circuit Switched FallBack) indicates technique for providing voice and other CS domain service by making the UE which is in an E-UTRAN accessed state fallback to a UTRAN/GERAN CS domain accessed state. The CSFB has been defined in 3GPP TS 23.272 v9.2.0, and thus detailed explanations thereof will be omitted.

Hereinafter, the present invention will be explained in more detail with reference to the aforementioned technical terms.

FIG. 2 is a signal flowchart showing ISR activation in a network in accordance with the conventional art. Referring to FIG. 2, once the UE 10 initially camping on the E-UTRAN cell moves to select the GERAN or UTRAN cell (S5), the UE 10 camps on the GERAN or UTRAN cell.

FIG. 2 illustrates procedures (S1~S4) to attach to the MME 20 by the UE 10 currently camping on the E-UTRAN, a procedure (S5) to reselect the GERAN or UTRAN as the UE 10 moves, routing area update procedure (S6~S13) with respect to the GERAN or UTRAN on which the UE camps on, and a procedure (S14) to reselect the E-UTRAN by the UE 10 as the UE 10 moves back to the E-UTRAN cell.

Hereinafter, an ISR activation process will be explained in more detail with reference to FIG. 2.

Once the UE 10 initially camps on the E-UTRAN cell, the UE 10 sends an Attach Request message to the MME 20 for location registration on the HSS 40 through the MME 20 (S1). The MME 20 sends an Update Location Request message to the HSS 40 so as to inform the UE's attach (S2).

The HSS 40 stores an identity (ID) of the MME 20 to which the UE 10 has attached, and sends an Update Location Ack message including the UE's subscriber information to the MME 20 (S3). The MME 20 sends an Attach Accept message to the UE 10 (S4). Through S1~S4, the UE 10 completes to attach to the MME 20 of the currently camped E-UTRAN cell, and registers the UE's location on the HSS 40.

Then, the UE 10 moves to camp on a coverage area of the GERAN or UTRAN cell, thereby reselecting the GERAN or UTRAN cell (S5). This requires for the UE 10 to perform Routing Area Update on the GERAN or UTRAN cell for location registration (S6~S13).

More concretely, the UE 10 sends a Routing Area Update Request message to the SGSN 30 so as to perform location registration on the HSS 40 through the SGSN 30 (S6). Through the Routing Area Update Request message, the SGSN 30 can recognize that the UE 10 has performed location registration on the MME 20 in the previous steps (S1~S4). The SGSN 30 sends a Context Request message to the MME 20 so as to receive context information on the UE 10 from the MME 20 on which location registration has been performed through S1~S4 (S7).

As a response to the Context Request message sent from the SGSN 30, the MME 20 sends a Context Response message including context information on the UE 10 to the SGSN 30 (S8). Here, the MME 20 includes an 'ISR Supported' parameter in the Context Response message so as to inform the SGSN 30 that the MME 20 can support an ISR feature. The UE's context information included in the Context Response message includes MM (Mobility Management) Context information, and EPS PDN Connections information. Here, the EPS PDN Connections information includes Bearer Context information. The MME 20 constitutes context information on the UE 10 which is to be included in the Context Response message, based on the MM context information and EPS bearer context information. The MM context information and the EPS bearer context information maintained by the MME have been defined in clause 5.7.2 (MME) of 3GPP TS 23.401 v9.3.0, and thus detailed explanations thereof will be omitted.

The SGSN 30 decides to activate or deactivate an ISR feature for the UE 10 (S9). More concretely, the SGSN 30 can recognize that the MME 20 supports an ISR feature by analyzing the 'ISR Supported' parameter included in the Context Response message received from the MME 20. Since the SGSN 30 also supports an ISR feature, the SGSN 30 decides to activate an ISR feature.

Since both of the MME 20 and the SGSN 30 support an ISR feature in S9, the SGSN 30 decides for ISR activation. As a response to the Context Response message sent from the MME 20, the SGSN 30 sends a Context Ack message to the MME 20 (S10). Here, the SGSN 30 informs the MME 20 that an ISR feature for the UE 10 has been activated, by including an 'ISR Activated parameter' in the Context Ack message.

Once the ISR feature has been activated, the SGSN 30 and the MME 20 store each mutual identity (ID). And, the MME 20 having received the Context Ack message including the 'ISR Activated' parameter from the SGSN 30 continuously maintains (keeps) the context information on the UE 10.

The Context Request of S7, the Context Response message of S8, and the Context Ack message of S10 have been defined in clause 7.3.5 (Context Request), 7.3.6 (Context Response) and 7.3.7 (Context Acknowledge) of 3GPP TS 29.274 v9.1.0, and thus detailed explanations thereof will be omitted.

The SGSN 30 sends an Update Location Request message to the HSS 40 so as to inform the UE's location registration (S11). And, the HSS 40 stores an identity (ID) of the SGSN 30 on which the UE 10 has performed Routing Area Update, and sends an Update Location Ack message including the UE's subscriber information to the SGSN 30 (S12).

The SGSN 30 sends a Routing Area Update Accept message to the UE 10 (S13). Here, the SGSN 30 informs the UE 10 ISR activation by including the 'ISR Activated' parameter in the Routing Area Update Accept message.

Through the attach procedures (S1~S4) and the routing area update procedures (S6~S13), the UE has performed location registration, and ISR activation has been performed since both of the MME 20 and the SGSN 30 support an ISR feature.

Even if the E-UTRAN is reselected as the UE 10 moves to the E-UTRAN from the GERAN or UTRAN (S14), the UE 10 does not have to perform location registration on the MME 20 since an ISR feature has been activated.

More concretely, after the ISR activation, the UE 10 does not have to perform location registration again on the network unless it leaves the routing area registered through the SGSN 30, or the tracking area registered through the MME 20. This feature (function) is ISR. A combined area of the routing area registered by the UE 10 through the SGSN 30, and the tracking area registered by the UE 10 through the MME 20 is called as an ISR area (refer to FIG. 1). When the UE frequently moves between the E-UTRAN and the UTRAN/GERAN, waste of network resources may be reduced by omitting repetitive location registration procedures under the ISR feature.

FIG. 3 is a signal flowchart showing data transfer on a downlink when an ISR feature has been activated. In FIG. 3, it is assumed that an ISR feature has been activated through the processes of FIG. 2. FIG. 3 shows a method for transferring downlink data to the UE which is in an idle mode when an ISR feature has been activated. For convenience, it is assumed that the UE of FIG. 3 camps on the E-UTRAN cell.

A Serving GW ('S-GW') 50 receives a downlink data packet with respect to the UE 10 through a P-GW 60 (S31). The S-GW 50 buffers the downlink data packet, and identifies a mobility management node serving the UE 10, a receiver of the downlink data packet. Through this identification procedure by the S-GW 50, it is checked that an ISR feature for the UE 10 has been activated, and both of the MME 20 and the SGSN 30 serve the UE 10. Accordingly, the S-GW 50 has to request for paging, to both of the MME 20 and the SGSN 30.

More concretely, the S-GW 50 sends a Downlink Data Notification message to the MME 20 and the SGSN 30, respectively (S32). As a response to the Downlink Data Notification message, the MME 20 and the SGSN 30 a Downlink Data Notification Ack message to the S-GW 50, respectively (S33).

The MME 20 and the SGSN 30 send a paging message to the UE 10 through each serving network (S34a~S35a and S34b~S35b). This will be explained in more detail as follows.

The MME 20 sends a paging message to each eNodeB 21 included in a tracking area on which the UE 10 has registered (S34a). The SGSN 30 sends a paging message to an RNC/BSC 31 (S34b).

Each eNodeB 21 having received the paging message from the MME 20 performs paging for the UE 10 (S35a). And, the RNC/BSC 31 having received the paging message from the SGSN 30 performs paging for the UE 10 (S35b).

In an assumption that that UE 10 currently camps on the E-UTRAN cell, the UE 10 responds to the paging via the E-UTRAN (i.e., S34a~S35a). The UE 10 performs a Service Request Procedure, thereby setting up a user plane as a path via the E-UTRAN (S36). The Service Request Procedure has been defined in clause 5.3.4.1 (UE triggered Service Request) of 3GPP TS 23.401 v9.3.0, and thus detailed explanations thereof will be omitted.

The S-GW 50 sends downlink data to the UE 10 through the E-UTRAN (via the eNodeB 21) (S37).

In FIG. 3, it is assumed that the UE 10 camps on the E-UTRAN cell. If the UE 10 of FIG. 3 camps on the UTRAN/GERAN cell rather than the E-UTRAN cell, the UE 10 will respond to a paging which has passes through the UTRAN/GERAN (i.e., S34*b*~S35*b*). And, if a user plane is set in S36, downlink data will be transferred to the UE 10 from the S-GW 50, via the UTRAN/GERAN (i.e., via the RNC/BSC 31 and the NodeB 32).

As aforementioned, since the network manages the UE's location as a unit of an ISR area, paging is performed as a unit of ISR area in order to transfer downlink data to the UE which is in an idle mode.

In an IMS network, an IMS voice service is provided to the UE over a Packet Switched (PS) domain or a Circuit Switched (CS) domain. Accordingly, the IMS network has to determine whether the UE can receive the IMS voice service over PS domain or CS domain.

In order for the SCC AS (Service Centralization and Continuity Application Server) to deliver a Mobile Terminating (MT) voice call to the UE in the IMS network, the SCC AS has to select an access domain (PS or CS domain) by executing Terminating Access Domain Selection (T-ADS) functionality. Here, the SCC AS has to select an access domain with consideration of the UE's current location, an access network's capability with respect to voice, etc.

Once an ISR feature has been activated in a state that whether the E-UTRAN can support IMS voice over PS session is not consistent with whether the UTRAN/GERAN can support IMS voice over PS session, the network will identify the UE's location at the ISR area. In this case, the network can not check the UE's precise location (whether the UE is in the E-UTRAN or UTRAN/GERAN). This may cause sequential paging from the CS domain to the PS domain, or from the PS domain to the CS domain for successful delivery of an MT voice call to the UE by the IMS network. For instance, in a state that the UE is located at a cell where IMS voice over PS session is not supported, the IMS network may firstly select the PS domain for delivery of an MT voice call. In this case, call setup delay, a critical factor of a voice call service may increase, and a caller may terminate his or her call while waiting for call connection. This may cause call loss.

DISCLOSURE OF THE INVENTION

Therefore, an object of the present invention is to provide a method for determining Idle mode Signaling Reduction (ISR) activation in a mobile communications system capable of allowing a Service Centralization and Continuity Application Server (SCC AS) to successfully send an MT voice call at a time by improving ISR activation. That is, an access domain for delivering a voice call can be precisely selected at a time by allowing the SCC AS to be aware of a precise current location of a User Equipment (UE). For this, when deciding to activate an ISR feature by a mobility management node (i.e., MME or SGSN), a condition (information) on whether each mobility management node can support IMS voice over PS domain (session), etc. may be further considered.

To achieve these and other advantages and in accordance with the purpose of the present invention, as embodied and broadly described herein, there is provided a method for determining Idle mode Signaling Reduction (ISR) activation in a mobile communications system, the method comprising:

(A) receiving, by a first network entity, a context response message including information on whether IP Multimedia Subsystem (IMS) voice over PS (packet switched) domain can be supported, from a second network entity; (B) deciding, by the first network entity, to activate or deactivate an idle mode signaling reduction (ISR) feature for a UE based on the information on whether IMS voice over PS domain can be supported; and (C) sending, by the first network entity, a context acknowledgement (Ack) message including information on the decision for ISR activation, to the second network entity.

Preferably, the method may further comprise: receiving, by the first network entity, a location registration request message, from the UE; and sending, by the first network entity, a context request message for acquiring location-registration information on location registration previously performed by the UE, to the second network entity.

Preferably, the method may further comprise: sending, by the first network entity, an update location request message including information on decision for the ISR activation, to a third network entity; and receiving, by the first network entity, a response message to the update location request message, from the third network entity.

Preferably, the method may further comprise sending, by the first network entity, a location registration acknowledgement (Ack) message including information on decision for the ISR activation, to the UE, as a response to the location registration request message.

Preferably, the response message to the update location request message may include subscriber information of the UE.

Preferably, the (B) may include: determining whether the first and second network entities support an ISR feature; determining whether the UE is a UE using IMS voice; and deciding to activate or deactivate the ISR feature according to whether the first and second network entities support IMS voice over PS domain.

In a case that the first and second network entities can support an ISR feature and the UE uses IMS voice, the first network entity preferably decides for ISR activation when both of the first and second network entities can support IMS voice over PS session, or do not support the IMS voice over PS session.

In a case that the first and second network entities can support an ISR feature and the UE uses IMS voice, the first network entity preferably decides for ISR deactivation when one of the first and second network entities can support IMS voice over PS session.

Preferably, the context response message in (A) may include at least one of an 'ISR Supported' parameter indicating information on whether the second network can support an ISR feature, and a parameter indicating information on whether the second network can support IMS voice over PS session. Preferably, the first network entity serving as a mobility management node is a mobility management entity (MME) of Evolved Universal Terrestrial Radio Access Network (E-UTRAN). And, the second network entity serving as a mobility management node is a Serving GPRS Support Node (SGSN) of Universal Terrestrial Radio Access Network (UTRAN) or GSM/EDGE Radio Access Network (GERAN).

Preferably, the context response message in (A) may include a parameter indicating information on whether the second network can support IMS voice over PS session.

Preferably, the first network entity serving as a mobility management node is a Serving GPRS Support Node (SGSN) of Universal Terrestrial Radio Access Network (UTRAN) or GSM/EDGE Radio Access Network (GERAN). And, the second network entity serving as a mobility management node is a mobility management entity (MME) of E-UTRAN.

Preferably, the information indicating decision for ISR activation may be indicated as an 'ISR deactivated parameter' or an 'ISR activated parameter'.

The present invention may have the following advantages.

Firstly, whether each mobility management node can support IMS voice over PS session can be determined, and the mobility management node can decide for ISR activation for a UE based on the determination.

Secondly, the UE can register a current location on a network according to activation or deactivation of the ISR feature. This may allow an IMS network to precisely select a corresponding domain for delivery of an MI voice call, thereby enabling successful transfer of an MT voice call to the UE at a time.

Thirdly, the method of the present invention may reduce signaling caused by unsuccessfully sending a voice call over PS domain by the IMS network and then by re-sending the voice call over CS domain by the IMS network, the signaling resulting from ISR activation without considering whether the mobility management node can support IMS voice over PS session. This may enhance efficiency of network resources. As unnecessary signaling is reduced, call delay according to voice call setup may be prevented.

MODES FOR CARRYING OUT THE PREFERRED EMBODIMENTS

Figure 1:
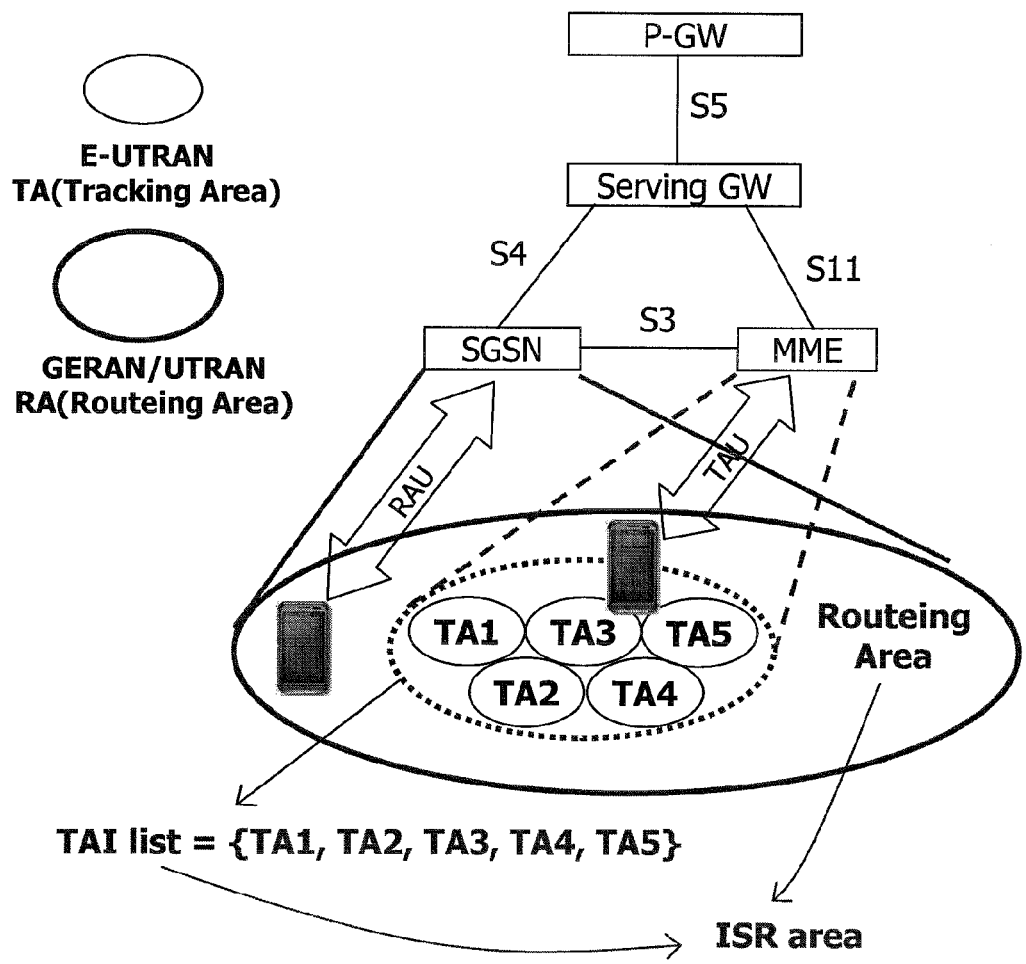
FIG. 1 is a configuration view of an Idle mode Signaling Reduction (ISR) service in accordance with the conventional art.

Reference will now be made in detail to the preferred embodiments of the present invention, examples of which are illustrated in the accompanying drawings.

The present invention is applied to a mobile communications system to which an Idle mode Signaling Reduction (ISR) is applied. However, the present invention is not limited to the system, but may also be applied to other next-generation communications systems and wired/wireless communications to which the technical scope of the present invention may be applied.

Various modifications and embodiments can be made in the present invention, and reference will be made in detail to the preferred embodiments of the present invention, examples of which are illustrated in the accompanying drawings. However, it should also be understood that embodiments are not limited by any of the details of the foregoing description, but rather should be construed broadly within its spirit and scope and it is intended that the present invention cover modifications and variations of this invention provided they come within the scope of the appended claims and their equivalents.

Though terms including ordinal numbers such as a first, a second, etc. may be used to explain various components, the components are not limited to the terms. The terms are used only for the purposed of distinguishing one component from another component. For instance, a first component may be referred to as a second component, or similarly, the second component may be referred to as the first component, without departing from the scope of the present invention. A term 'and/or' is used to include a combination of a plurality of disclosed items or one of the items.

In a case it is mentioned that a certain component is "connected" or "accessed" to another component, it may be understood that the certain component is directly connected or accessed to the another component or that a component is interposed between the components. On the contrary, in case it is mentioned that a certain component is "directly connected" or "directly accessed" to another component, it should be understood that there is no component therebetween.

Terms used in the present invention is to merely explain specific embodiments, thus it is not meant to be limiting. A singular expression includes a plural expression except that two expressions are contextually different from each other. In the present invention, a term "include" or "have" is intended to indicate that characteristics, figures, steps, operations, components, elements disclosed on the specification or combinations thereof exist. Rather, the term "include" or "have" should be understood so as not to pre-exclude existence of one or more other characteristics, figures, steps, operations, components, elements or combinations thereof or additional possibility.

Except that they are not differently defined, all terms used in the present invention including technical or scientific terms have the same meanings with terms that are generally understood by those skilled in the art related to the field of the present invention. The terms same as those of which are defined in a general dictionary should be understood that the terms have meanings same as contextual meanings of the related art. And, as long as the terms are not definitely defined in the present invention, the terms are not interpreted as ideal or excessively formal meanings.

The terms used in the present invention will be explained as follows.

A terminal indicates all devices which can perform the technical features of the present invention. The terminal includes not only a mobile communication terminal (e.g., a user equipment (UE), a mobile phone, a portable phone, a DMB phone, a game phone, a camera phone, a smart phone, etc.) for setting up an IP tunnel with a network and transmitting and receiving data to/from a network node through the setup IP tunnel, but also a notebook, a desktop computer, a laptop computer, a palmtop computer, a personal digital assistant (PDA), white goods, etc.

An access system indicates a network via which a terminal accesses a core network for the purpose of communications (e.g., voice communications, data communications, video communications). For instance, referring to FIG. 1, a 3GPP access system includes UTRAN/GERAN or E-UTRAN, and a non-3GPP access network includes I-WLAN or CDMA/WiMax. This access system may not be limited to a wireless access system, but may be applied to a wired access system, e.g., a broadband access network or a digital subscriber line (DSL).

An Internet Protocol (IP) tunnel indicates a data path for communications between entities (e.g., a terminal and a network node).

A mobility protocol indicates a protocol used by a UE for mobility management and data transfer by accessing a core network. The mobility protocol used between the terminal and the network may include a plurality of types according to a type and a characteristic of an access system.

An attach indicates a state that a terminal accesses a network node, which includes an attach occurring in the event of handover.

Hereinafter, the present invention will be explained in more detail based on the above technical terms.

A concept of the present invention is that activation or deactivation of an ISR feature is decided according to a UE's capability in a network to which an ISR feature is applied, or a capability of a network in a case that voice over PS domain can not be supported (e.g., in a case that an incoming voice call can not be received over PS domain). That is, in the present invention, when deciding, by a mobility management node, ISR activation for a UE in an IMS network environment where hetero mobile communications networks (e.g., E-UTRAN and UTRAN/GERAN) interwork with each other, considered are not only whether the mobility management node can support an ISR feature, and whether the UE can use IMS voice, but also conditions (information) on whether each mobility management can support IMS voice over PS domain.

Reference will now be given in detail to the preferred embodiments of the present invention, examples of which are illustrated in the accompanying drawings. Wherever possible, the same reference numerals will be used through the drawings to refer to the same or similar parts, and the same descriptions thereof are omitted.

Figure 4:
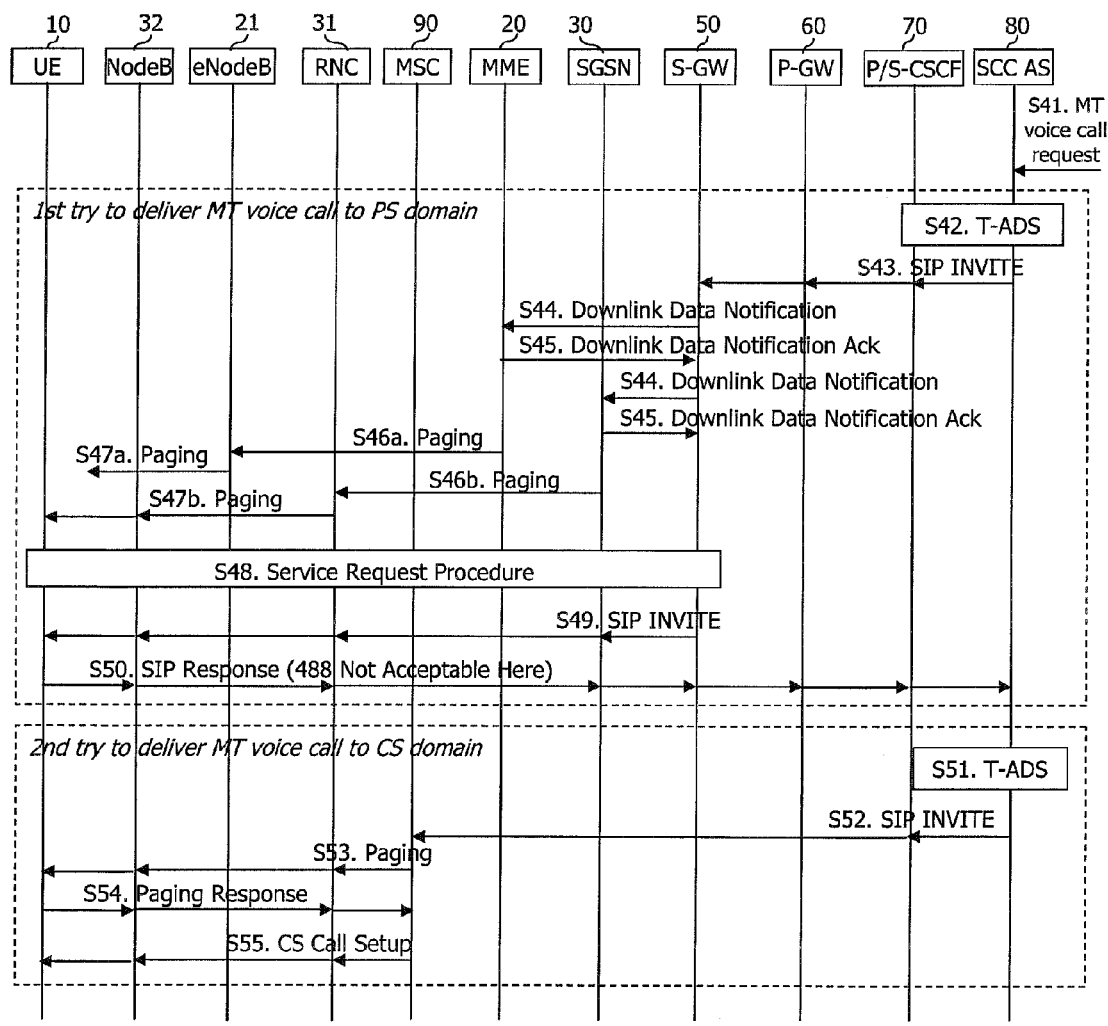
FIG. 4 is a signal flowchart showing a process for delivering an MT voice call to a UE by an IMS network when an ISR feature has been activated.

FIG. 4 is a signal flowchart showing a process for delivering an MT voice call to a UE by an IMS network when an ISR feature has been activated. FIG. 4 is implemented in assumptions that (1) an ISR feature for a UE10 has been activated, (2) the UE10 has performed location registration on E-UTRAN and UTRAN (or GERAN), (3) the E-UTRAN on which the UE10 has performed location registration supports IMS voice over PS session, whereas the UTRAN on which the UE10 has performed location registration does not support IMS voice over PS session, (4) the ISR feature is activated after the UE10 has performed location registration through the E-UTRAN, and then the UE camps on the UTRAN by leaving the E-UTRAN.

Hereinafter, the present invention will be explained with reference to FIG. 4 in the above assumptions.

An SCC AS 80 receives an SIP INVITE message requesting for an incoming voice call to an ICS subscriber served by itself (S41).

The SCC AS 80 determines a domain (i.e., PS domain or CS domain) to which a voice call is to be delivered by using a T-ADS function (S42). Here, the T-ADS serves to perform domain selection for voice call delivery with consideration of capabilities of an access network (e.g., whether IMS voice over PS session can be supported), capabilities of a UE, an IMS registration state, a CS domain registration state, a user preferences, an operator policies, etc. Whether an access network on which the ICS subscriber UE performed location registration recently can support IMS voice over PS session may be determined by the SCC AS 80 through an HSS 40 (not shown in FIG. 4). The SCC AS 80 having performed the T-ADS function determines to deliver a voice call to a PS domain with considering that the UE 10 camps on an E-UTRAN cell which supports IMS voice over PS session. The reason is because the SCC AS 80 can not precisely check whether the UE 10 currently camps on the E-UTRAN cell or the UTRAN cell.

An SIP INVITE message for generating a session for a voice call transmitted to the UE 10 by the SCC AS 80 is delivered to a serving gateway (S-GW) 50 via an S-CSCF, a P-CSCF 70 and a P-GW 60 (S43).

The S-GW 50 identifies a mobility management node which is serving the UE 10, a receiver of an incoming voice call. Since an ISR feature for the UE 10 is in an activated state, both of an MME 20 and an SGSN 30 are in a service state for the UE 10. Accordingly, the S-GW 50 has to request for paging to both of the MME 20 and the SGSN 30 which are in a service state for the UE 10. That is, the S-GW 50 sends a Downlink Data Notification message to the MME 20 and the SGSN 30 (S44).

As a response to the Downlink Data Notification message, the MME 20 and the SGSN 30 respectively send a Downlink Data Notification Ack message to the S-GW 50 (S45).

The MME 20 and the SGSN 30 respectively perform paging for the UE 10. That is, the MME 20 sends a paging message to each base station (e.g., eNodeB) 21 which belongs to a tracking area (s) registered by the UE 10 (S46a). And, the SGSN 30 sends a paging message to an RNC 31 (S46b).

Each eNodeB 21 having received the paging message from the MME 20 performs paging for the UE 10 (S47a). And, the RNC 31 having received the paging message from the SGSN 30 sends the paging message to the UE 10 via a NodeB 32 (S47b).

Since the UE 10 currently camps on the UTRAN cell, the UE 10 responses to a UTRAN network with respect to the paging performed by the SGSN 30. More concretely, the UE 10 sets-up a user plane as a path via the UTRAN, by performing a service request procedure (S48). Details about the service request procedure have been defined in clause 6.12.1 (MS Initiated Service Request Procedure Using Gn/Gp) and clause 6.12.1A (UE Initiated Service Request Procedure Using S4) of 3GPP TS 23.060 v9.3.0.

The S-GW 50 sends an SIP INVITE message to the UE 10 through the SGSN 30. That is, the SIP INVITE message is delivered to the UE 10 from the S-GW 50 via the SGSN 30, the RNC 31 and the NodeB 32, sequentially (S49).

Since the UTRAN on which the UE 10 currently camps on does not support IMS voice over PS session, the UE 10 having received the SIP INVITE message sends an SIP Response message (i.e., 488 Not Acceptable Here) to the SCC AS 80 indicating rejection against request for SIP session generation for a voice call (S50).

The above procedures S42~S50 represent a series of procedures for delivering an incoming voice call to the UE 10 over PS domain. The UE 10 cannot receive an IMS voice call over PS domain through the procedures of S42~S50. Accordingly, the UE 10 has to receive a voice call over CS domain. S51~S55 in FIG. 4 represent procedures for transferring an incoming voice call of S41 to the UE 10 by changing the current domain into CS domain.

More concretely, the SCC AS 80 having received the rejection message against request for SIP session generation from the UE 10 through S50 performs the T-ADS function again so as to deliver the incoming voice call of S41 (S51). Accordingly, the SCC AS 80 checks that the UE 10 cannot receive a voice call over PS domain. Then, the SCC AS 80 having performed the T-ADS function determines to deliver the voice call over CS domain.

The SIP INVITE message for generating a session for the voice call transferred to the UE 10 by the SCC AS 80 is delivered to the MSC server 90 via the S-CSCF and P-CSCF 70 (S52). The MSC server 90 can perform interworking between an SIP message and a CS message as an enhanced MSC server for providing an ICS function.

The MSC server 90 sends a paging message to the UE 10 over CS domain so as to deliver the incoming voice call (S53). The paging message of S53 is delivered to the UE 10 via the RNC 31 and the NodeB 32.

The UE 10 responds to the paging by the MSC server 90 (S54). As the MSC server 90 sends a CS Call Setup message to the UE 10 (S55), the UE 10 can successfully receive the incoming voice call of S41 (not shown).

If the UE 10 receives a paging message from the MME 20 (S46a and S47a) and the SIP INVITE of S49 while camping on the initial E-UTRAN cell (here, the SIP INVITE is delivered through the E-UTRAN), the UE 10 can successfully receive the incoming voice call of S41 delivered to the PS domain. Accordingly, the UE 10's response is indicated as an SIP 200 OK instead of the SIP Response message of S50 (i.e., 488 Not Acceptable Here), and requires no procedure for delivering an MI voice call over CS domain (i.e., S51~S55).

As shown in FIG. 4, when an ISR feature is activated in an IMS network environment where heterogeneous mobile communications networks (e.g., E-UTRAN and UTRAN/GERAN) interwork with each other, a specific network (e.g., UTRAN or GERAN) may not support a voice call over PS domain. In this case, the network cannot check whether the UE camps on the E-UTRAN where a voice call can be supported over PS domain, or the UTRAN/GERAN where a voice call can not be supported over PS domain. Accordingly, the incoming voice call delivered to the PS domain may be delivered to the CS domain through a domain switch procedure. This may cause call setup delay in the aspect of the network, resulting in call loss and lowering of call reliability.

In order to overcome the problem occurring in FIG. 4, the present invention proposes a method for successfully delivering an MT voice call to the UE at a time by the SCC AS by improving ISR activation.

More concretely, in the present invention, an access domain for delivery of an incoming voice call (i.e., PS domain or CS domain) is precisely selected at a time by informing a precise current location of the UE to the SCC AS. For this, the mobility management node (i.e., MME or SGSN) decides to activate or deactivate an ISR feature, and conditions for deciding to activate or deactivate the ISR feature are defined.

The method for determining whether to activate an ISR feature by a network entity, i.e., the mobility management node (MME or SGSN) will be explained in brief as follows.

① It is determined whether both of a first network entity (e.g., MME) and a second network entity (e.g., SGSN) support an ISR feature. Here, if one of the first and second network entities does not support the ISR feature, the ISR feature is not activated.

② If both of the first and second network entities support the ISR feature, it is determined whether the UE uses voice over IMS. If the UE does not use voice over IMS, the ISR feature is activated.

③ If the UE uses voice over IMS, it is determined whether the first network entity can support the voice over IMS over PS domain is consistent with whether the second network entity can support the voice over IMS over PS domain (i.e., whether access networks belong to a Homogeneous ISR area). If one of the first and second network entities support IMS voice over PS domain, an ISR feature is not activated.

Hereinafter, will be explained conditions considered when deciding to activate or deactivate an ISR feature by the network entity according to the present invention.

1) A condition about whether the UE uses voice over IMS: This condition may be determined by at least one of the following conditions. The following conditions may be acquired by the mobility management node itself, the UE, or another node of the network. Concrete conditions are as follows.

whether a user has subscribed to an ICS;
whether the UE has been registered on an IMS network for voice;
domain preference for the UE's voice;
whether an access network currently location-registered can support IMS voice over PS session;
the UE's capabilities relating to voice;
whether a serving network can support CSFB (CS Fall-Back).

2) A condition about whether an access network on which the UE previously performed location registration (first network entity) can support IMS voice over PS session, and whether an access network on which the UE currently performs location registration (second network entity) can support IMS voice over PS session are consistent with each other. Here, when both of the previously location-registered access network and the currently location-registered access network support IMS voice over PS session, or both of them do not support the IMS voice over PS session, it is defined as a homogeneous ISR area. The homogeneous ISR area may be determined into the following two types according to a subject of a network.

The MME decides to activate an ISR feature in the following cases. An access network on which the UE previously performed location registration is UTRAN/GERAN, and an access network on which the UE currently performs location registration is E-UTRAN. It is determined whether the UTRAN/GERAN can support IMS voice over PS session is consistent with whether the E-UTRAN can support IMS voice over PS session.

The SGSN decides for ISR activation in the following cases. An access network on which the UE previously performed location registration is E-UTRAN, and an access network on which the UE currently performs location registration is UTRAN/GERAN. It is determined whether the E-UTRAN can support IMS voice over PS session is consistent with whether the UTRAN/GERAN can support IMS voice over PS session.

Hereinafter, will be explained the method for determining whether access networks belong to a homogeneous ISR area by the mobility management node (i.e., MME or SGSN). As aforementioned, the homogeneous ISR area is determined by determining whether an access network on which the UE previously performed location registration (e.g., E-UTRAN or UTRAN/GERAN) can support IMS voice over PS session, and whether an access network on which the UE currently performs location registration (e.g., E-UTRAN or UTRAN/GERAN) can support IMS voice over PS session are consistent with each other. Examples of the determination are shown as follows:

1) One mobility management node compares information included in a Context Response message received from another mobility management node (e.g., SGSN in case of MME, and MME in case of SGSN), and indicating whether said another mobility management node can support IMS voice over PS session, with information indicating whether itself can support IMS voice over PS session. If the mobility management nodes differently support IMS voice over PS session with respect to each UE, a supported value for IMS voice over PS session preset for each UE has to be stored in a UE context. For instance, the MME stores the supported value which may be defined as a parameter in MM and EPS bearer Contexts, and the SGSN stores the supported value in MM and PDP/EPS Bearer Contexts. Then, when one mobility management node sends a Context Response message to another mobility management node, the supported value (e.g., a corresponding parameter including the supported value) is sent together. Details about MM and PDP/EPS Bearer Contexts information on the UE maintained by the MME have been defined in clause 5.7.2 (MME) of 3GPP TS 23.401 v9.3.0, and details about MM and PDP/EPS Bearer Contexts information on the UE maintained by the SGSN have been defined in clause 13.2.3 (Context fields for one MS) of 3GPP TS 23.060 v9.3.0. Therefore, additional detailed explanations thereof will not be repeated.

2) One mobility management node may send a supported value for IMS voice over PS session to another mobility management node (e.g., SGSN in case of MME, and MME in case of SGSN), through a new message defined in the present invention, or through the existing message transferred to said another mobility management node, not through a context response message. One mobility management node stores therein a value received from another mobility management node, and utilizes the value when necessary.

3) One mobility management node may pre-store information on whether another mobility management node (e.g., SGSN in case of MME, and MME in case of SGSN) can support IMS voice over PS session (e.g., through setup about the mobility management node when configuring a network), thereby comparing whether another mobility management node can support IMS voice over PS session with whether itself can support IMS voice over PS session.

Figure 2:
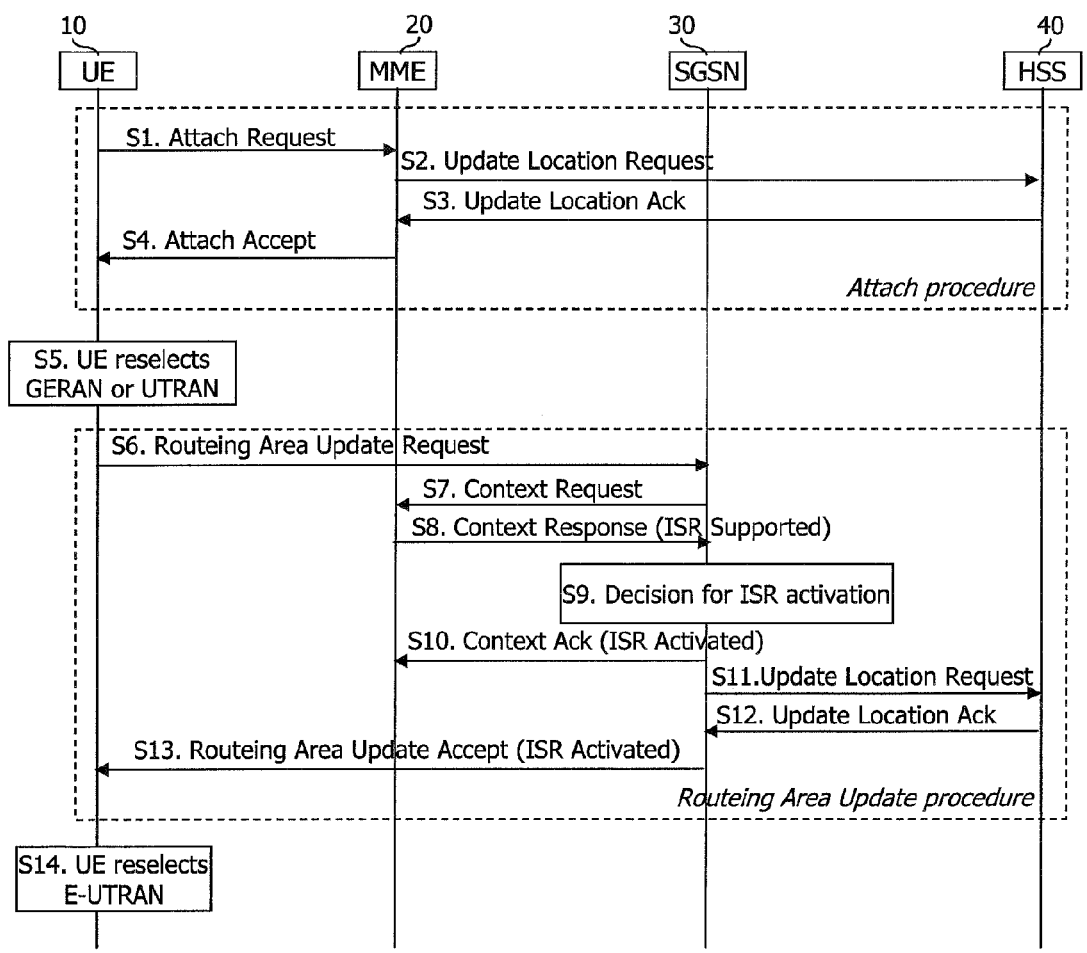
FIG. 2 is a signal flowchart showing ISR activation in a network in accordance with the conventional art.
Figure 3:
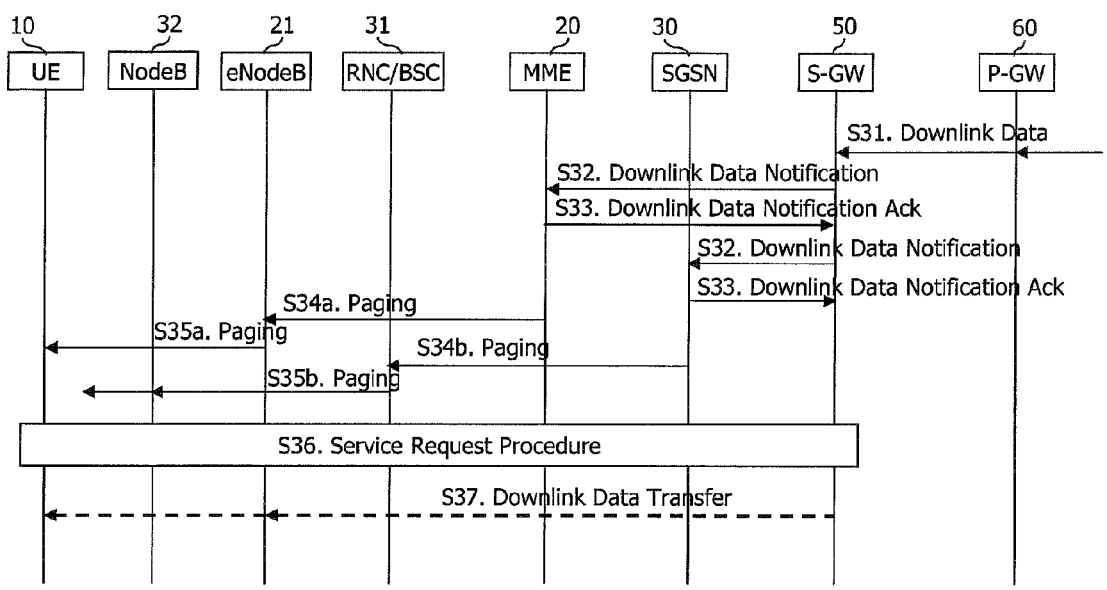
FIG. 3 is a signal flowchart showing data transfer on a downlink when an ISR feature has been activated.

As aforementioned, in the present invention, whether to activate an ISR feature or deactivate is decided based on, not only whether the MME and the SGSN can support the ISR feature (S9 in FIG. 2), but also two added conditions, i.e., whether the UE uses voice over IMS, and whether the MME and the SGSN can support voice over IMS over PS domain (i.e., a supported value for IMS voice over PS session).

In the present invention, whether to activate or deactivate an ISR feature may be decided based on not only the two added conditions, but also the following conditions. In some cases, even if the two added conditions do not satisfy the ISR activation, the ISR activation may be performed by the following conditions. On the contrary, even if the two added conditions satisfy the ISR activation, the ISR activation may not be performed by the following conditions:

HPLMN (Home Public Land Mobile Network) flag: A flag indicating preference about an ISR feature set by a Home PLMN. The flag may be variously set, e.g., one flag per PLMN or one flag per subscriber, thereby activating or deactivating the ISR feature.

A policy and a configuration of a serving network: Activation or deactivation of an ISR feature may be possible according to an ISR-related policy and a configuration of a network where a UE is located.

Figure 5:
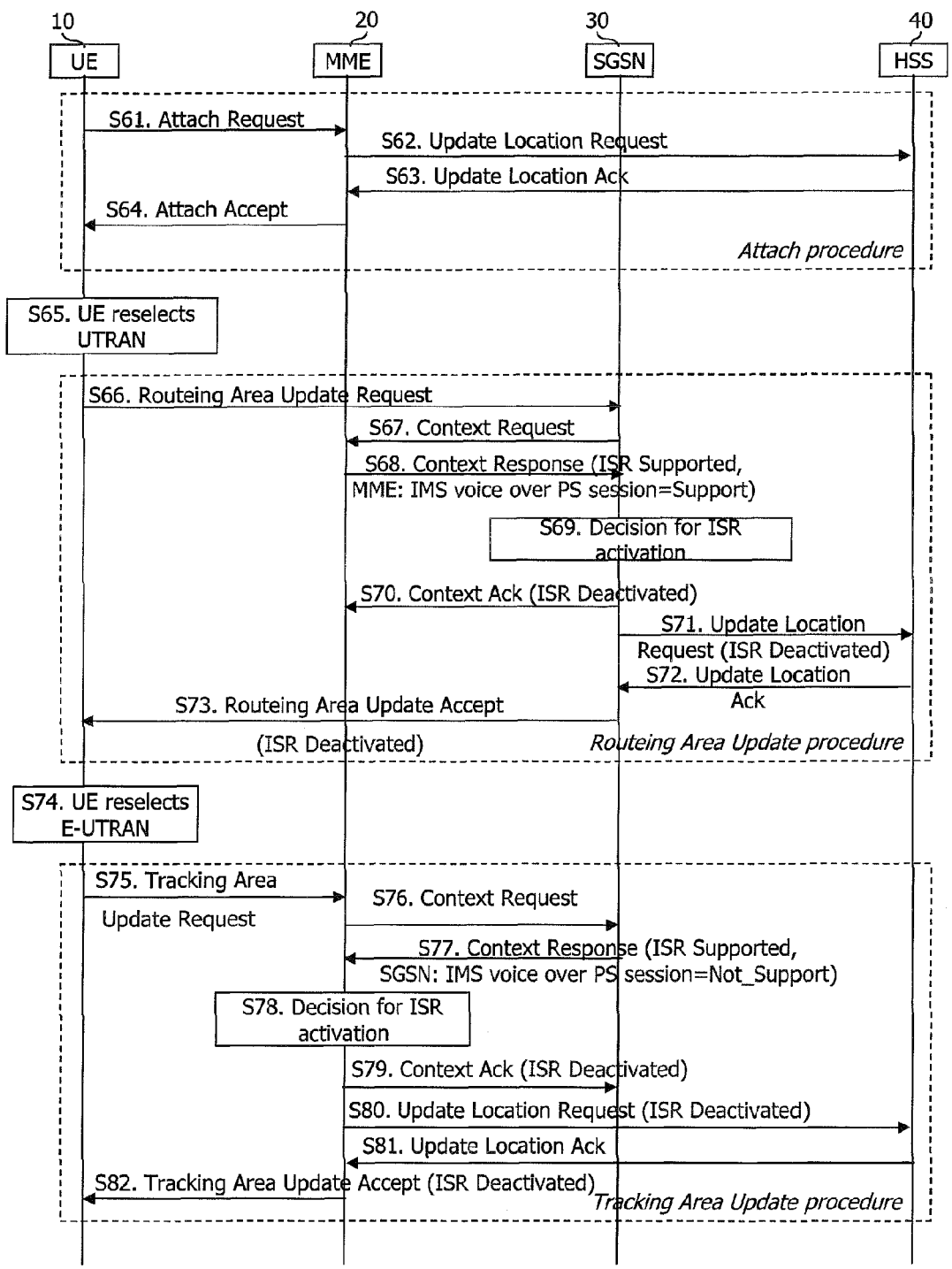
FIG. 5 is a signal flowchart showing a process for deciding to activate or deactivate an ISR feature according to the present invention.

FIG. 5 is a signal flowchart showing a process to decide for ISR activation or deactivation according to the present invention.

Referring to FIG. 5, it is assumed that the UE uses voice over IMS, and the E-UTRAN supports IMS voice over PS session whereas the UTRAN does not support IMS voice over PS session. It is also assumed that both of the MME and SGSN support an ISR feature. The mobility management node determines whether access networks belong to a homogeneous ISR area (i.e., whether an access network on which the UE previously performed location registration can support IMS voice over PS session, and whether an access network on which the UE currently performs location registration can support IMS voice over PS session are consistent with each other) by the first method of the three methods, i.e., a method for acquiring information on whether another mobility management node can support IMS voice over PS session through a context response message.

In FIG. 5, it is assumed that the UE moves to the UTRAN cell after performing an attach procedure in an initially camped state on the E-UTRAN cell, and then camps on the E-UTRAN cell.

The procedures of FIG. 5 consist of procedures for attaching to the network by the UE (S61~S64), routing area update procedures (S66~S73), and tracking area update procedures (S75~S82).

Referring to FIG. 5, once the UE 10 camps on the E-UTRAN cell, the UE 10 sends an Attach Request message to the MME 20 for location registration on the HSS 40 (S61). The MME 20 sends an Update Location Request message to the HSS 40 so as to inform the UE's attach (S62).

As a response to the Update Location Request message, the HSS 40 stores an identity (ID) of the MME 20 to which the UE 10 has attached, and sends an Update Location Ack message including the UE's subscriber information to the MME 20 (S63). The MME 20 sends an Attach Accept message to the UE 10 (S64). Through S61~S64, the UE 10 attaches to the MME 20 of the E-UTRAN cell.

Then, the UE 10 moves to camp on the UTRAN cell, thereby reselecting the UTRAN cell (S65). This requires Routing Area Update procedures by the UE 10 (S66~S73).

More concretely, the UE 10 sends a Routing Area Update Request message to the SGSN 30 so as to perform location registration on the HSS 40 through the SGSN 30 (S66). The Routing Area Update Request message includes information indicating that the UE 10 has performed location registration on the MME 20. Accordingly, through the Routing Area Update Request message, the SGSN 30 can recognize that the UE 10 has performed location registration on the MME 20. The SGSN 30 sends a Context Request message to the MME 20 so as to receive context information on the UE 10 from the previously location-registered MME 20 (S67).

As a response to the Context Request message sent from the SGSN 30, the MME 20 sends a Context Response message to the SGSN 30 (S68). Here, the MME 20 includes an ISR Supported parameter (refer to FIG. 5) in the Context Response message so as to inform the SGSN 30 that the MME 20 can support an ISR feature. Also, the MME 20 includes, in the Context Response message, a parameter indicating that the MME 20 can support IMS voice over PS session for the UE 10 (MME: IMS voice over PS session=Support in FIG. 5) so as to inform the SGSN 30. Here, the MME 20 can inform the SGSN 30 that it can support IMS voice over PS session for the UE 10 by the following methods. For instance, the parameter indicating that the MME 20 can support IMS voice over PS session may not be included in the Context Response message. Alternatively, the parameter may be included in the Context Response message with a value set as 'Support' or 'Positive'. S68 of FIG. 5 shows that the Context Response message includes a parameter indicating that the MME 20 can support IMS voice over PS session with a value set as 'Support'.

The SGSN 30 decides to activate or deactivate an ISR feature for the UE 10 based on the parameters (S69). More concretely, the 'ISR Supported' parameter included in the Context Response message received from the MME 20 indicates that the MME 20 can support an ISR feature and the SGSN 30 can also support an ISR feature. For final decision for ISR activation, the SGSN 30 additionally determines whether the UE can use voice over IMS, and whether the access networks belong to a homogeneous ISR area. As aforementioned, the UE 10 is a user equipment using voice over IMS. Accordingly, it is determined whether the access networks belong to a homogeneous ISR area. According to the parameter included in the Context Response message of S68 ("IMS Supported parameter over PS domain"), the E-UTRAN supports IMS voice over PS session. However, the UTRAN on which the UE 10 currently camps on does not support IMS voice over PS session. Accordingly, the E-UTRAN on which the UE previously performed location registration and the UTRAN on which the UE currently performs location registration are not a homogeneous ISR area. As a result, the SGSN 30 finally decides not to activate an ISR feature (S69). Based on the decision for ISR deactivation in S69, the UE 10 has to register its location on the network whenever moving to the UTRAN cell from the E-UTRAN cell, or to the E-UTRAN form the UTRAN.

As a response to the Context Response message sent from the MME 20, the SGSN 30 sends a Context Ack message to the MME 20 (S70). Here, the SGSN 30 having decided for ISR deactivation sends the Context Ack message with information on ISR deactivation. For instance, the ISR deactivation may be indicated by including no 'ISR Activated parameter' in the Context Ack message, or by including an 'ISR Activated parameter' in the Context Ack message with a value set as '0' or 'Negative', or by including an 'ISR Deactivated parameter' in the Context Ack message. S70 of FIG. 5 shows the Context Ack message including an 'ISR Deactivated parameter'.

The SGSN 30 sends an Update Location Request message to the HSS 40 so as to inform the UE's location registration (S71). Here, the SGSN 30 having decided for ISR deactivation sends the Update Location Request message to the HSS 40 with information indicating ISR deactivation. For instance, the ISR deactivation may be indicated by including an 'ISR Deactivated parameter' in the Update Location Request message, or by including no 'ISR Activated parameter' in the Update Location Request message, or by including an 'ISR Activated parameter' in the Update Location Request message with a value set as '0' or 'Negative'.

The HSS 40 stores an identity (ID) of the SGSN 30 on which the UE 10 has performed Routing Area Update, and sends an Update Location Ack message including the UE's subscriber information to the SGSN 30 (S72).

As a response to the Routing Area Update Request message of S66, the SGSN 30 sends a Routing Area Update Accept message to the UE 10 (S73). Here, the SGSN 30 having decided for ISR deactivation sends the Routing Area Update Accept message to the UE 10 with information indicating ISR deactivation. For instance, the ISR deactivation may be indicated by including no 'ISR Activated parameter' in the Routing Area Update Accept message, or by including an 'ISR Activated parameter' in the Routing Area Update Accept message with a value set as '0' or 'Negative', or by including an 'ISR Deactivated parameter' in the Routing Area Update Accept message.

After performing the Routing Area Update procedure, the UE 10 may move back to the E-UTRAN cell (i.e., tracking area location-registered through the network attach procedures of S61~S64). Here, the UE 10 reselects the E-UTRAN cell (S74).

Since ISR deactivation has been decided in S69, the UE 10 performs Tracking Area Update procedures (S75~S82). Hereinafter, the Tracking Area Update procedures will be explained in more detail.

The UE 10 sends a Tracking Area Update Request message to the MME 20 so as to perform location registration on the HSS 40 through the MME 20 (S75).

Through the Tracking Area Update Request message, the MME 20 recognizes that the UE 10 has performed location registration on the SGSN 30. In order to obtain context information on the UE 10 from the SGSN 30, the MME 20 sends a Context Request message to the SGSN 30 (S76).

As a response to the Context Request message sent from the MME 20, the SGSN 30 sends a Context Response message to the MME 20. Here, the SGSN 30 informs the MME 20 that itself can support an ISR feature, by including an "ISR Supported parameter" in the Context Response message. Also, the SGSN 30 includes, in the Context Response message, a parameter informing the MME 20 that itself does not support IMS voice over PS session for the UE 10 (i.e., SGSN: IMS voice over PS session=Not_Support). In order to inform that the SGSN 30 does not support IMS voice over PS session for the UE 10, an IMS voice support parameter over PS session may not be included in the Context Response message. Alternatively, an IMS voice support parameter over PS session may be included in the Context Response message with a value set as 'Not_Support' or 'Negative'. S77 of FIG. 5 shows the Context Response including an IMS voice support parameter over PS session set as Not_Support'.

The MME 20 decides to activate or deactivate an ISR feature for the UE 20 (S78). The decision in S78 is the same as the decision in S69 except that a decision subject is the MME 20.

S78 will be explained in more detail. The "ISR Supported parameter" included in the Context Response message received from the SGSN 30 indicates that the SGSN 30 supports an ISR feature. In the aforementioned assumption, the MME 20 also supports an ISR feature. For final decision for ISR activation, the MME 20 additionally determines whether the UE 10 can use voice over IMS, and whether the access networks belong to a homogeneous ISR area. As aforementioned, the UE 10 is a user equipment using voice over IMS. Accordingly, it is determined whether the access networks belong to a homogeneous ISR area. According to the parameter included in the Context Response message of S77 (SGSN: IMS voice over PS session=Not_Support), the UTRAN does not support IMS voice over PS session. However, the E-UTRAN supports IMS voice over PS session. Accordingly, the UTRAN and the E-UTRAN do not belong to a homogeneous ISR area. As a result, the MME 20 finally decides not to activate an ISR feature.

As a response to the Context Response message sent from the SGSN 30, the MME 20 sends a Context Ack message to the SGSN 30 (S79). Here, the MME 20 having decided for ISR deactivation sends the Context Ack message with information indicating ISR deactivation. For instance, the ISR deactivation may be indicated by including no 'ISR Activated parameter' in the Context Ack message, or by setting an 'ISR Activated parameter' as '0' or 'Negative', or by including an 'ISR Deactivated parameter' in the Context Ack message.

The MME 20 sends an Update Location Request message to the HSS 40 so as to inform the UE's location registration (S80). Here, the MME 20 having decided for ISR deactivation sends the Update Location Request message to the HSS 40 with information indicating ISR deactivation. For instance, the ISR deactivation may be indicated by including no 'ISR Activated parameter' in the Update Location Request message, or by setting an 'ISR Activated parameter' as '0' or 'Negative', or by including an 'ISR Deactivated parameter' in the Update Location Request message.

The HSS 40 stores an identity (ID) of the MME 20 on which the UE 10 has performed Tracking Area Update, and sends an Update Location Ack message including the UE's subscriber information to the MME 20 (S81).

As a response to the Tracking Area Update Request message, the MME 20 sends a Tracking Area Update Accept message to the UE 10 (S82). Here, the MME 20 having decided for ISR deactivation sends the Tracking Area Update Accept message to the UE 10 in S82 with information indicating ISR deactivation. For instance, the ISR deactivation may be indicated by including no 'ISR Activated parameter' in the Tracking Area Update Accept message, or by setting an 'ISR Activated parameter' as '0' or 'Negative', or by including an 'ISR Deactivated parameter' in the Tracking Area Update Accept message.

The processes in S71 and S72, i.e., the processes for informing the UE's location registration to the HSS 40 by the SGSN 30 may not be performed. For instance, in a case that the SGSN 30 already has the UE's available subscriber's information by the UE's previous location registration and has performed update location registration on the HSS 40, the processes in S71 and S72 may not be performed. However, even in the case that the processes in S71 and S72 are not performed, the SCC AS can successfully deliver an MT voice call to the UE at a time by the enhanced ISR activation method of the present invention. This is equally applied to the processes of S80 and S81 in FIG. 5, i.e., the processes for informing the UE's location registration to the HSS 40 by the MME 20. For instance, in a case that the MME 20 already has the UE's available subscriber's information by the UE's previous location registration and has performed update location registration on the HSS 40, the processes in S80 and S81 may not be performed. However, even in the case that the processes in S80 and S81 are not performed, the SCC AS can successfully deliver an MT voice call to the UE at a time by the enhanced ISR activation method of the present invention.

As the UE 10 performs location registration whenever reselecting the E-UTRAN which supports IMS voice over PS session and the UTRAN which does not support IMS voice over PS session, the SCC AS 80 in FIG. 4 can obtain, through the HSS 40, precise information on whether an access network on which the UE performed location registration recently can support IMS voice over PS session. Based on this information, the SCC AS 80 of FIG. 4 selects a PS domain for delivering an incoming MT voice call when the UE 10 camps on the E-UTRAN, whereas the SCC AS 80 of FIG. 4 selects a CS domain for delivering an incoming MT voice call when the UE 10 camps on the UTRAN. This may allow the SCC AS 80 of FIG. 4 to select a corresponding domain, and to successfully deliver an MT voice call over the selected domain at a time.

FIG. 5 shows an embodiment that the UE 10 performs location registration on the E-UTRAN while initially camping on the E-UTRAN, and then performs location registration on the UTRAN by reselecting the UTRAN by moving to the UTRAN. This embodiment is equally applied even when the UE 10 performs location registration on the UTRAN while initially camping on the UTRAN, and then performs location registration on the E-UTRAN by moving to the E-UTRAN. In this case, the UE 10 performs an attach procedure through the SGSN 30 not through the MME 20 (S61~S64 in FIG. 5). Once the UE 10 moves to camp on the E-UTRAN, the UE 10 reselects the E-UTRAN (S65 in FIG. 5), and performs Tracking Area Update procedures (S75~S82 in FIG. 5). Accordingly, the MME 20 decides not to activate an ISR feature and performs the UE's location registration on the HSS 40. Once the UE 10 moves to camp on the UTRAN, the UE 10 reselects the UTRAN (S74 in FIG. 5), and performs Routing Area Update procedures (S66~S73 in FIG. 5). Accordingly, the SGSN 30 decides not to activate an ISR feature and performs the UE's location registration on the HSS 40.

The 'ISR Deactivated parameter' included in S70, S71, S73, S79, S80 and S82 in FIG. 5 was explained as an example for delivering information on ISR-related decision for convenience. Accordingly, through an indication value by an indicator which indicates activation or deactivation of an ISR feature, or an independent message which indicates a result of ISR decision, a node having received a corresponding message can analogize the result of ISR decision.

Hereinafter, with reference to FIG. 5, will be explained a procedure for deciding to activate an ISR feature, and a procedure for successfully receiving an incoming voice call by the UE at a time after the UE's location registration.

More concretely, will be separately explained a case for deciding to activate or deactivate an ISR feature for the UE which uses voice over IMS by the mobility management node (e.g., SGSN or MME), from a case for successfully delivering an MT voice call to one of a PS domain and a CS domain by the IMS network, the one selected based on the decision.

1) When both of the E-UTRAN and the UTRAN/GERAN support IMS voice over PS session (i.e., when the mobility management mode determines that the access networks belong to a homogenous ISR area), an ISR feature is activated through the procedures in FIG. 5. Here, an incoming MT voice call is delivered to the UE as follows:

When the UE camps on the E-UTRAN cell, an IMS network successfully delivers an MT voice call to the UE over PS session;

When the UE camps on the UTRAN/GERAN cell, the IMS network successfully delivers an MT voice call to the UE over PS session.

2) When both of the E-UTRAN and the UTRAN/GERAN do not support IMS voice over PS session (when the mobility management node determines the access networks belong to a homogenous ISR area), an ISR feature is activated through the processes of FIG. 5. Here, an incoming MT voice call is delivered to the UE as follows:

When the UE camps on the E-UTRAN cell, the IMS network successfully delivers an MT voice call to the UE over CS session. Here, a CS FallBack service is used;

When the UE camps on the UTRAN/GERAN cell, the IMS network successfully delivers an MT voice call to the UE over CS session.

3) When the E-UTRAN supports IMS voice over PS session and the UTRAN/GERAN does not support IMS voice over PS session (when the mobility management node determines that the access networks do not belong to a homogenous ISR area), an ISR feature is not activated through the processes of FIG. 5. Here, an incoming MT voice call is delivered to the UE as follows:

When the UE camps on the E-UTRAN cell, the IMS network successfully delivers an MT voice call to the UE over PS session;

When the UE camps on the UTRAN/GERAN cell, the IMS network successfully delivers an MT voice call to the UE over CS session.

4) When the E-UTRAN does not support IMS voice over PS session and the UTRAN/GERAN supports IMS voice over PS session (when the mobility management node determines that the access networks do not belong to a homogenous ISR area), an ISR feature is not activated through the processes of FIG. 5. Here, an incoming MT voice call is delivered to the UE as follows:

When the UE camps on the E-UTRAN cell, the IMS network successfully delivers an MT voice call to the UE over CS session. Here, a CS FallBack service is used;

When the UE camps on the UTRAN/GERAN cell, the IMS network successfully delivers an MT voice call to the UE over PS session.

In addition, the above various embodiments may be implemented by using, computer software, hardware, or some combination thereof. For instance, the method of the present invention may be stored in a storage medium (e.g., internal memory, flash memory, hard disc, etc.), or may be implemented in codes or commands inside a software program that can be executed by a processor such as a microprocessor inside a UE.

It will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for determining idle mode signaling reduction (ISR) activation in a mobile communications system, the method comprising:
   (A) receiving, by a first network entity, information on whether IP Multimedia Subsystem (IMS) voice over packet switched (PS) domain is able to be supported, from a second network entity;
   (B) deciding, by the first network entity, to activate or deactivate an idle mode signaling reduction (ISR) feature based on the information on whether IMS voice over PS domain is able to be supported; and
   (C) sending, by the first network entity, a context acknowledgement (Ack) message including information on the decision for ISR activation, to the second network entity, wherein the (B) comprises:
   determining whether the first and second network entities support an ISR feature;
   determining whether the UE is a UE using IMS voice; and
   deciding to activate or deactivate the ISR feature according to whether the first and second network entities support IMS voice over PS session.

2. The method of claim 1, further comprising:
   receiving, by the first network entity, a location registration request message, from a UE; and
   sending, by a first network entity, a context request message for acquiring location-registration information on location registration previously performed by the UE, to the second network entity,
   wherein a context response message includes information on whether IP Multimedia Subsystem (IMS) voice over packet switched (PS) domain is able to be supported.

3. The method of claim 2, further comprising:
   sending, by the first network entity, a location registration acknowledgement (ACK) message including information on decision for the ISR activation, to the UE, as a response to the location registration request message.

4. The method of claim 2, wherein the context response comprises an ISR Supported parameter indicating information on whether the second network entity supports an ISR feature.

5. The method of claim 2, wherein the context response message comprises a parameter indicating information on whether the second network entity supports IMS voice over PS session.

6. The method of claim 1, further comprising
   sending, by the first network entity, an update location request message including information on decision for the ISR activation, to a third network entity; and
   receiving, by the first network entity, a response message to the update location request message, from the third network entity.

7. The method of claim 6, wherein the response message to the update location request message comprises subscriber information of the UE.

8. The method of claim 1, wherein in a case that the first and second network entities support an ISR feature and the UE uses IMS voice, the first network entity decides for ISR activation when both of the first and second network entities support IMS voice over PS session, or do not support the IMS voice over PS session.

9. The method of claim 1, wherein in a case that the first and second network entities support an ISR feature and the UE uses IMS voice, the first network entity decides for ISR deactivation when one of the first and second network entities supports IMS voice over PS session and the other one does not support.

10. The method of claim 1, wherein the first network entity serving as a mobility management node is a mobility management entity (MME) of Evolved Packet System (EPS) which manages Evolved Universal Terrestrial Radio Access Network (E-UTRAN),
    wherein the second network entity serving as a mobility management node is a Serving GPRS Support Node (SGSN) of Universal Mobile Telecommunication System (UMTS) which manages Universal Terrestrial Radio Access Network (UTRAN) or GSM/EDGE Radio Access Network (GERAN).

11. The method of claim 1, wherein the first network entity serving as a mobility management node is a Serving GPRS Support Node (SGSN) of Universal Mobile Telecommunication System (UMTS) which manages Universal Terrestrial Radio Access Network (UTRAN) or GSM/EDGE Radio Access Network (GERAN),
    wherein the second network entity serving as a mobility management node is a mobility management entity (MME) of Evolved Packet System (EPS) which manages Evolved Universal Terrestrial Radio Access Network (E-UTRAN).

12. The method of claim 1, wherein the information indicating decision for ISR activation is indicated as an 'ISR deactivated parameter' or an 'ISR activated parameter'.

* * * * *